United States Patent [19]

Gajjar

[11] 4,323,882

[45] Apr. 6, 1982

[54] METHOD OF, AND APPARATUS FOR, INSERTING CARRIER FREQUENCY SIGNAL INFORMATION ONTO DISTRIBUTION TRANSFORMER PRIMARY WINDING

[75] Inventor: Jagdishchandra T. Gajjar, Saratoga, N.Y.

[73] Assignee: General Electric Company, Schenectady, N.Y.

[21] Appl. No.: 155,454

[22] Filed: Jun. 2, 1980

[51] Int. Cl.³ .............................................. H04B 3/56
[52] U.S. Cl. .................................... 340/310 R; 307/3; 340/825
[58] Field of Search ........ 340/310 R, 310 A, 310 CP, 340/147 R; 307/3, 7; 363/171, 148, 9, 2

[56] References Cited

U.S. PATENT DOCUMENTS

| | | |
|---|---|---|
| 3,460,121 | 8/1969 | Wattenburg . |
| 4,017,845 | 4/1977 | Kilian et al. ...................... 340/310 R |
| 4,188,619 | 2/1980 | Perkins ............................. 340/310 R |
| 4,194,128 | 3/1980 | Biglin ............................... 340/310 R |
| 4,254,402 | 3/1981 | Perkins ............................. 340/310 R |

*Primary Examiner*—Donald J. Yusko
*Attorney, Agent, or Firm*—Geoffrey H. Krauss; James C. Davis, Jr.; Marvin Snyder

[57] ABSTRACT

Power line carrier frequency signals are provided at a distribution transformer primary winding by controlled current injection onto the neutral and phase conductors of the distribution transformer secondary winding circuit, with the direction of current flow in each half of the secondary winding being controlled in in-phase additive fashion. Apparatus for causing in-phase distribution secondary winding current flow includes a pair of electronic current control means supplying in-phase currents to a pair of secondary windings of an auxiliary transformer having its primary winding coupled to half of the distribution transformer secondary winding and having the auxiliary transformer secondary winding center tap coupled to local neutral through a band-stop filter and to the remaining distribution transformer secondary winding through a band-pass filter for augmentation of signal current flow into the distribution transformer.

14 Claims, 4 Drawing Figures

METHOD OF, AND APPARATUS FOR, INSERTING CARRIER FREQUENCY SIGNAL INFORMATION ONTO DISTRIBUTION TRANSFORMER PRIMARY WINDING

BACKGROUND OF THE INVENTION

The present invention relates to power line carrier systems and, more particularly, to a novel method of, and novel apparatus for, driving the secondary windings of a distribution transformer to insert power line carrier signals onto the primary winding thereof, for transmission over a power distribution network.

Many different systems are known for communication of information utilizing power lines as the transmission media. In a typical system, information may be transmitted from a central facility for reception at a remote location, or may be transmitted from the remote location for reception at the central facility. In the latter case, the remotely located transmitter is typically coupled to the secondary winding of a distribution transformer and the remote location transmitter must provide sufficient signal power for providing a power line carrier signal of significant amplitude upon the conductors of the power distribution network connected between the distribution transformer primary winding and the central location. Due to the large admittances of power-consuming loads connected to the power transformer secondary winding, a relatively great amount of signal power must be supplied to the distribution transformer secondary winding in order to cause transmission of a power line carrier (PLC) signal with a sufficiently high signal-to-noise ratio to assure reliable detection at the central facility. If a conventional transmitter is utilized to provide this relatively large signal power, the transmitter and its associated power supply (which must be relatively large in size and relatively stable and ripple-free) will be relatively expensive. Accordingly, any method capable of increasing the signaling current coupled to the power line, without requiring a transmitter of increased power output, and also overcoming the need for the stable, ripple-free power supply, is desirable in terms of cost-effectiveness.

BRIEF SUMMARY OF THE INVENTION

In accordance with the invention, power line carrier frequency signals are provided at a primary winding of a power distribution transformer by injection of controlled currents, at the power line carrier frequency, on the phase wires or on the neutral conductor connected to a secondary winding of the distribution transformer; the direction of current flow through a plurality of sections of the distribution transformer secondary winding are controlled to cause the signal currents to be phase-additive, whereby the signal currents augment one another to provide a greater signal current flow in the distribution transformer primary winding. Thus, both phases of a distribution transformer secondary winding are simultaneously driven in-phase for augmentation of distribution transformer primary winding PLC signaling current.

In one presently preferred embodiment, one-half of the power distribution transformer secondary winding receives its signaling current from a primary winding of an auxiliary transformer having a center-tapped secondary winding, which is driven by push-pull current sources. A band-stop filter is provided between the auxiliary transformer secondary winding center tap and a common neutral connection to both current sources, while a band-pass filter is provided between the secondary winding center tap and the phase conductor connection of the remaining distribution transformer secondary winding section, whereby currents flow through both portions of the distribution transformer secondary winding in phase-additive manner, for augmentation of the distribution transformer primary winding PLC signal current.

Accordingly, it is an object of the present invention to provide a novel method of delivering significant amounts of signal power into a distribution transformer primary winding.

It is another object of the present invention to provide a novel method for simultaneously driving current into both phases of a center-tapped power distribution transformer secondary winding so as to augment power line carrier currents in the primary winding thereof.

It is still another object of the present invention to provide novel apparatus for delivering significant amounts of power line carrier signal power into a distribution transformer primary winding.

It is yet another object of the present invention to provide novel apparatus for simultaneously driving power line carrier signaling currents into both phases of a power distribution transformer secondary winding so as to augment power line carrier signaling current flow in the primary winding thereof.

These and other objects of the present invention will become apparent to one skilled in the art upon consideration of the following detailed description, when taken in conjunction with the drawings.

DETAILED DESCRIPTION OF THE INVENTION

Figure 1:
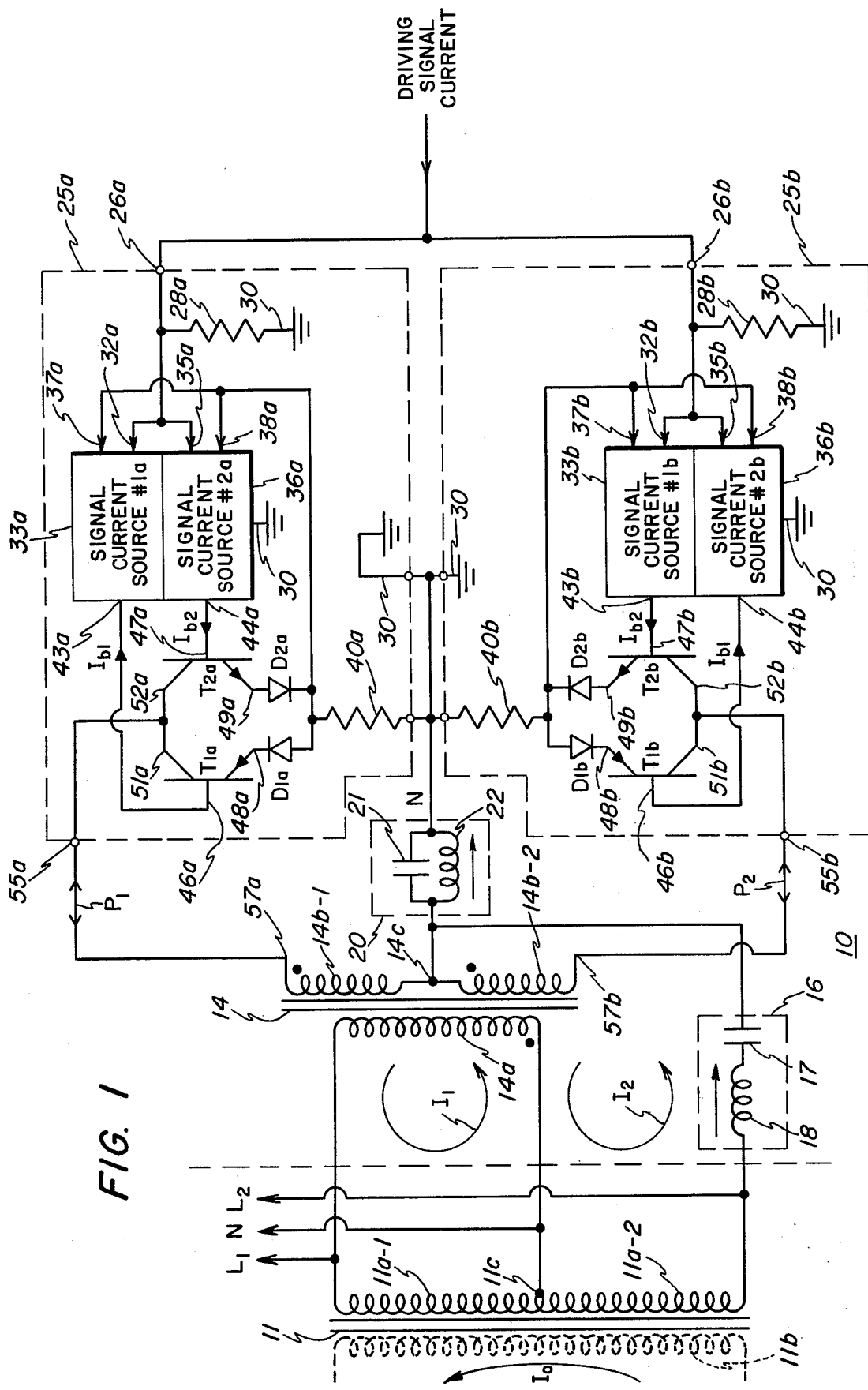
FIG. 1 is a schematic block diagram of novel apparatus facilitating the use of the novel method of the present invention.

Referring to FIG. 1, apparatus 10 provides inphase power line carrier signal excitation to a secondary circuit 11a of a power distribution transformer 11, having its primary winding 11b connected to a power distribution network (not shown). The distribution transformer primary circuit 11b may be a single winding, as shown, for connection between two power distribution network phase conductors or between one phase conductor and a neutral conductor, or may be a plurality of windings connected in a desired configuration to a multi-phase power distribution network, with or without neutral conductor. As illustrated, the distribution transformer secondary circuit has a pair of secondary windings 11a-1 and 11a-2, joined together at secondary circuit center tap 11c. The three wires of the transformer secondary circuit are connected to the neutral N (at the secondary winding center tap) and to a pair of phase conductors $L_1$ and $L_2$, of a two-phase three-wire circuit, which is to be utilized for energization of end-user loads and the like.

In accordance with the invention, current $I_1$ flowing in a first portion $11a$-1 of the secondary circuit provides a flux in transformer 11, which flux is augmented by another flux due to the flow of a second current $I_2$ in the remaining portion $11a$-2 of the secondary circuit. Thus, the signal current $I_o$ flowing in primary winding $11b$ will, if currents $I_1$ and $I_2$ are phased properly, be proportional to the sum thereof, i.e. $I_o = (I_1 + I_2)/n$, where n is related to the ratio of the number of turns in the winding of each of the portions $11a$-1 and $11a$-2 of the transformer secondary circuit to the number of turns in the winding of distribution transformer primary circuit $11b$.

Circuit 10, providing the properly phased distribution transformer secondary circuit driving currents, includes a transformer 14 having a primary winding $14a$ connected between one phase conductor, i.e. conductor $L_1$, and the neutral conductor N, and therefore across one section, e.g. section $11a$-1, of the distribution transformer secondary circuit. Transformer 14 also has a secondary winding $14b$, isolated from primary winding $14a$, and comprised of a pair of secondary winding sections $14b$-1 and $14b$-2, having a center tap $14c$ therebetween. The phasing of current flow in secondary winding portions $11b$-1 and $11b$-2 and in primary winding $14a$ is as given by the phasing dots associated therewith. Center tap $14c$ is connected, via a filter 16, which may be a simple high-pass filter using a series capacitance 17, or preferably, a series-resonant band-pass filter including capacitance 17 and a series, tunable inductance 18, to the junction between the end of the remaining distribution transformer secondary circuit portion $11a$-2 and the remaining load phase conductor, e.g. conductor $L_2$. Center tap $14c$ is also connected to neutral conductor N through a band-stop filter 20, having a capacitance 21 in electrical parallel connection with a tunable inductance 22. Band-stop filter 20 is designed to substantially oppose the flow of current therethrough at any power line carrier transmission frequency utilized, but to permit the flow of current substantially without attenuation at the power line frequency (e.g., 60 Hz. in the United States). Filter 16 is designed to have a high impedance at the power transmission frequency, and, if a band-pass configuration is used, to oppose the flow of currents at all frequencies other than the power line carrier transmission frequency. Typically, the power line carrier transmission frequencies are two or three orders of magnitude larger than the power line frequency, whereby filter 16 may be a single capacitor 17, without requiring use of inductance 18.

Connected between neutral conductor N and the free end of an associated auxiliary transformer secondary winding section $14b$-1 or $14b$-2, is one of a pair of electronic current control circuit means $25a$ or $25b$, respectively. Each of circuit means $25a$ and $25b$ has an associated input $26a$ or $26b$, for receiving a driving signal, at the power line carrier signal frequency and having a characteristic (frequency, phase, amplitude, duration and the like) thereof modulated for information transmission. In the illustrated embodiment, the driving signal current is applied to each circuit means input 26, and flows through associated input resistance $28a$ or $28b$, whereby a driving signal voltage is generated at each circuit means input 26. It should be understood that a driving signal voltage may be applied directly to each input 26, whereby the shunt input resistance 28, between the associated input 26 and a local ground 30, may not be required. The driving signal voltage is applied to the first input $32a$ or $32b$ of the first signal current source $33a$ or $33b$, respectively, and also to a first input $35a$ or $35b$ of a second signal current source $36a$ or $36b$, respectively. The first and second signal current sources in each circuit means have second inputs, $37a$ or $37b$ and $38a$ or $38b$, tied together and connected to local ground 30 via a "metering" resistance $40a$ or $40b$. Local ground 30 of each circuit means is connected to neutral conductor N. Each signal current source $33a$, $33b$, $36a$ and $36b$ has a corresponding output $43a$, $43b$, $46a$ and $46b$, respectively, connected to the input electrode, e.g. the base electrode, of an associated solid-state current-controlling-and-amplifying device, e.g. associated base electrodes $46a$, $46b$, $47a$ and $47b$ of respective transistors $T_{1a}$, $T_{1b}$, $T_{2a}$ and $T_{2b}$. Each pair of devices in one of the circuit means 25 is of opposite type, e.g. transistor $T_{1a}$ is a PNP device while the other transistor $T_{2a}$, in circuit means $25a$, is an NPN device. Similarly, transistor $T_{1b}$, in circuit means $25b$ is a PNP device, and the other transistor $T_{2b}$ is a NPN device. The emitter electrode of each of the devices is connected via an associated diode to the junction between resistance 40 and the parallel inputs of both signal current sources for that circuit means. The diodes are polarized so as to be forward-biased with current flow through the associated transistor. Thus, a first diode $D_{1a}$ has the anode thereof connected to resistor $40a$ and the cathode thereof connected to the emitter lead $48a$ of associated transistor $T_{1a}$, in circuit means $25a$; another diode $D_{1b}$ is similarly connected, having its anode connected to resistor $40b$ and its cathode connected to the emitter electrode $48b$ of transistor $T_{1b}$, in circuit means $25b$. Similarly, the NPN transistors $T_{2a}$ (in circuit means $25a$) and $T_{2b}$ (in circuit means $25b$), have their respective emitter electrodes $49a$ and $49b$ respectively connected to the anode of an associated diode $V_{2a}$ and $V_{2b}$, respectively. The cathodes of diodes $D_{2a}$ and $D_{2b}$ are connected to the associated resistor $40a$ or $40b$, respectively. The collector electrodes $51a$ and $52a$ of devices $T_{1a}$ and $T_{2a}$, respectively, are connected together and to an associated circuit means output $55a$, which is itself connected to the end of an associated winding, e.g. end $57a$ of secondary winding section $14b$-1. Similarly, the collector electrodes $51b$ and $52b$ of respective transistors $T_{1b}$ and $T_{2b}$ are connected together and to an output $55b$ of second electronic current control circuit means $25b$, and thence to an end $57b$ of the remaining secondary winding section $14b$-2. It should be understood that other types of semiconductor devices may be utilized, and that any differential-input signal current source may be utilized, as long as the sourced or sunk output current thereof is controlled by the differential input voltage. Thus, the control current $I_{b1}$, from the base electrodes of the PNP transistors $T_{1a}$ and $T_{1b}$, is flowing towards the associated signal current sources $33a$ and $36b$, and is of magnitude proportional to the difference between the input voltage, across one of resistances 28, and the voltage across the associated one of resistances 40, with respect to local ground (the neutral conductor), which voltage is itself proportional to the current $P_1$ or $P_2$, flowing in the auxiliary transformer secondary winding sections. Similarly, the base current $I_{b2}$ sourced by signal current sources $36a$ or $33b$, into devices $T_{2a}$ or $T_{2b}$, respectively, is proportional to the difference between the input voltage and the voltage developed across resistance 40, for the driving signal current of the opposite polarity from the polarity enabling current signal sources 33a and 36b.

In operation, it is assumed, for purposes of illustration, that phase-shift-keyed signals are to be transmitted over a narrow frequency bandwidth. The driving signal current oscillates at the power line carrier transmit frequency and provides a sinusoidal waveform to circuit means inputs 26a and 26b. During one half of the driving signal current waveform, e.g. the positive half-cycle, signal current sources 33a and 33b respectively each sink and source sinusoidal pulses of current respectively from and to associated devices $T_{1a}$ and $T_{2b}$. The power frequency, e.g. 60 Hz., voltage provided to auxiliary transformer primary winding 14a, also provides a potential across each auxiliary transformer secondary winding section 14b-1 and 14b-2, and thus between circuit means output terminals 55a and 55b, and the local ground connection at the neutral N conductor. This potential enables current flow through the driven transistors (in this case, during the positive half cycle of the driving signal current, devices $T_{1a}$ and $T_{2b}$). Current thus flows from the neutral conductor through first current control circuit means metering resistor 40a, thence through forward-biased diode $D_{1a}$, conducting transistor $T_{1a}$, from the collector electrode thereof to control circuit output 55a, thence into winding end 57a and through auxiliary transformer secondary winding section 14b-1 to the auxiliary transformer secondary winding center tap 14c. Another current also flows from auxiliary transformer secondary winding center tap 14c through the remaining secondary winding portion 14b-2 and from the end 57b thereof, into second current control circuit means output 55b, through the collector-emitter conduction path of transistor $T_{2b}$, thence through the forward-biased diode $D_{2b}$ and metering resistor 40b, into the neutral conductor N. As the return currents cannot flow from neutral connector N to auxiliary transformer secondary center tap 14c, due to the presence of band-stop filter 20, the PLC frequency current in the neutral conductor flows, as current $I_2$, through distribution transformer secondary circuit winding portion 11a-2, thence through filter 16 (which has a relatively low attenuation at the PLC frequency) and thence to auxiliary transformer secondary winding center tap 14c. The flow of current to both portions 14b-1 and 14b-2 of the auxiliary transformer secondary winding, in the same direction, provide a current $I_1$ in the primary winding 14a thereof, which also flows through the other portion of the distribution transformer secondary circuit winding portion 11a-1. As the phasing of the auxiliary transformer primary connection is chosen such that the flux in the distribution transformer core due to the flow of current $I_1$, adds to the flux generated by the controlled current $I_2$ flowing through the auxiliary transformer secondary winding; the distribution transformer primary circuit current $I_o$ is thus twice as great as the current flowing therein would be if apparatus 10 were not utilized.

During the opposite-polarity half of the driving signal current, at the PLC frequency, remaining current signal sources 36a and 36b are operative to cause associated transistors $T_{2a}$ and $T_{1b}$ to conduct current in the opposite direction, changing the polarity of the distribution transformer primary winding current $I_o$, but still providing a current magnitude which is caused by the additive action of both currents $I_1$ and $I_2$, thereby augmenting the magnitude of the PLC signal transmitted to the power distribution network.

Figure 2:
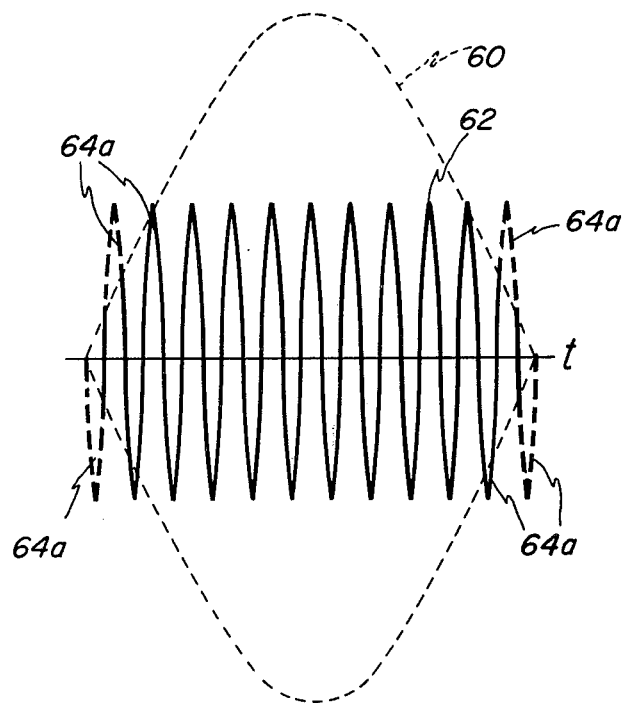
FIG. 2 is a graphical illustration of the waveform of the current flowing in the neutral conductor, during one-half cycle of the power line potential, in apparatus utilizing the present invention.

The signal transmitted is illustrated in FIG. 2, wherein the broken-line current waveform 60, plotted with respect to time t, over one-half of a power frequency (60 Hz.) cycle, is shown. The ideal power line carrier signal current waveform 62, being a sinusoid of frequency several orders of magnitude greater than the power line frequency, is nevertheless limited in peak amplitude, to the associated amplitude of the line current such that the actual waveshape has the peaks 64a thereof truncated to the value of the power line current waveform 60, whenever the amplitude of ideal PLC current waveform 62 attempts to exceed the power line current instantaneous amplitude.

Figure 3A:
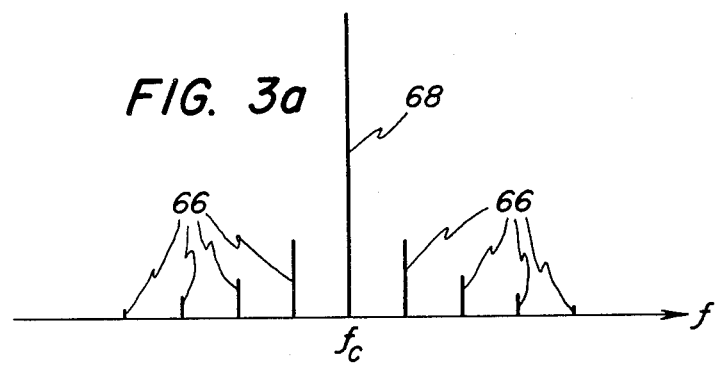
FIGS. 3a and 3b are frequency spectra of current flowing when the apparatus of the present invention respectively utilizes a broad-band band-stop filter and narrow-band circuits.
Figure 3B:
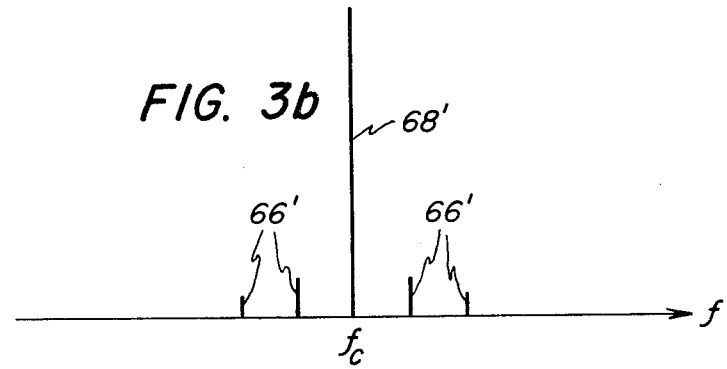

This limiting of the PLC frequency waveform, by clipping waveform tips 64a, provides a PLC frequency spectra, shown in FIG. 3a, in which sidebands 66 occur above and below the PLC center frequency 68, assuming the use of a continuous-wave signal current and a relatively broad-band band-stop filter 20. As energy at one of undesired frequencies 66 may create intermodulation and other problems in a multi-frequency PLC signaling system, it is more desirable to utilize high-Q, narrow-band LC tuned-circuit filters, as illustrated in FIG. 1, rather than broad band filter 20 and a simple capacitive reactance for filter 16. Thus, as seen in FIG. 3b, the adjacent spurious frequencies, caused by the current waveform limiting action clipping peaks 64a (FIG. 2), will be of lesser amplitude, due to the greater attenuation characteristics of the band-pass and band-stop filters illustrated; the amplitude of the desired PLC frequency carrier 68' will not (if filters 16 and 20 are properly designed in manner known to the art) be substantially different from the amplitude of carrier 68 (FIG. 3a) in the broad-band filter situation.

There has just been described a novel method for the use of induced current to generate supporting flux in a distribution transformer for providing enhanced power line carrier signaling currents in a power distribution network, the control of current flow being based upon the polarity of the power network potential, and novel apparatus for carrying out of my novel method.

Many variations and modifications of my novel method and apparatus will now occur to those skilled in the art; accordingly, I wish to be limited only by the scope of the impending claims, rather than the specific details presented herein for one presently preferred embodiment of my novel method and apparatus.

What is claimed is:

1. A method for inserting an information-carrying carrier frequency signal onto a power distribution network connected to a primary winding of a distribution transformer having a plurality of secondary windings coupled thereto, comprising the steps of:
    (a) causing a like plurality of currents to each flow through one of the distribution transformer secondary winding sections;
    (b) modulating a characteristic of each of said like plurality of currents in accordance with the information to be transmitted; and
    (c) establishing the instantaneous direction of current flow of each of said like plurality of currents to provide in-phase additive contributions to the transformer core flux and to the resulting current flowing in the distribution transformer primary winding to cause the carrier frequency signal current flowing therethrough to be proportional to the sum of the currents flowing in all of said plurality of secondary winding portions.

2. A method for inserting an information-carrying carrier frequency signal onto a power distribution network connected to a primary winding of a distribution transformer having a pair of secondary winding portions joined together at a neutral conductor, comprising the steps of: providing an auxiliary transformer having a primary winding and a secondary winding; connecting the auxiliary transformer primary winding across a first section of said distribution transformer secondary winding to cause a first carrier frequency signal current to flow therethrough; connecting the auxiliary transformer secondary winding to cause a second current to flow through the remaining portion of said distribution transformer secondary winding in-phase and of equal amplitude, with the auxiliary transformer primary winding current flowing through said first distribution transformer secondary winding section; modulating a characteristic of each of said first and second currents in accordance with the information to be transmitted; and establishing the instantaneous direction of current flow of each of said first and second currents to provide in-phase additive contributions to the resulting current flowing in the distribution transformer primary winding to cause the carrier frequency signal current flowing therethrough to be proportional to the sum of the first and second currents in the secondary winding portions.

3. The method as set forth in claim 2, wherein said auxiliary transformer secondary winding is center tapped, and further comprising the steps of: providing means connected between the auxiliary transformer secondary winding center tap and the remaining portion of the distribution transformer secondary winding for allowing substantially unattenuated current flow at the carrier frequency and having a substantial attenuation at the frequency of a power distribution network waveform; providing means coupled between said auxiliary transformer secondary winding center tap and the neutral conductor for substantially preventing current flow at the carrier signal frequency; and causing substantially equal amplitude currents to flow through each of the pair of auxiliary transformer secondary winding sections toward said center tap.

4. Apparatus for inserting an information-carrying carrier frequency signal onto a power distribution network connected to the primary winding of a distribution transformer having a plurality of secondary winding portions, comprising:
means for providing a plurality of currents having the carrier frequency and being amplitude modulated in accordance with the information to be transmitted; and
means for causing the carrier frequency signal currents to flow in each one of the plurality of distribution transformer secondary windings with instantaneous direction to cause the plurality of secondary winding portion currents to generate distribution transformer core flux and a resulting primary winding current both having in-phase additive contribution from each secondary winding portion current.

5. Apparatus for inserting an information-carrying carrier frequency signal onto a power distribution network connected to the primary winding of a distribution transformer having a secondary winding having first and second secondary winding portions each with a first end joined together and connected to a neutral conductor and each with a second end, comprising:
means for providing a plurality of currents having the carrier frequency and being amplitude modulated in accordance with the information to be transmitted; and
an auxiliary transformer having a primary winding connected to said distribution transformer first secondary winding portion and having a center-tapped secondary winding, each portion of the auxiliary transformer secondary winding receiving a different one of the amplitude-modulated carrier frequency currents from said current providing means;
first means connected between the second end of said distribution transformer second secondary winding portion and said auxiliary transformer secondary winding center-tap for providing a relatively low impedance to a carrier frequency signal current flowing therebetween and for providing a relatively high impedance to current flow at the frequency of a power distribution network waveform; and
second means connected between said neutral conductor and said auxiliary transformer secondary winding center-tap for providing a relatively low impedance to a current at the frequency of the power distribution network waveform flowing therebetween and for providing a relatively high impedance to current flow therebetween at said carrier frequency;
the carrier frequency currents flowing in said first and second secondary winding portions of said distribution transformer having instantaneous directions to generate a primary winding current having in-phase additive contribution from each secondary winding portion current.

6. The apparatus of claim 5, wherein said first means comprises a capacitive element.

7. The apparatus as set forth in claim 6, wherein said first means further comprises a series inductance element.

8. The apparatus as set forth in claim 7, wherein the inductive reactance of said inductance element is adjustable to be series resonant with the electrical capacitance of said capacitive element at said carrier signal frequency.

9. The apparatus of claim 5, wherein said second means comprises another capacitive element; and another inductive element in electrical parallel connection with said another capacitive element.

10. The apparatus as set forth in claim 9, wherein the inductive reactance of said another inductive element is adjustable to be parallel resonant with the capacitive reactance of said another capacitive element at said carrier signal frequency.

11. The apparatus of claim 5, wherein said current providing means includes first and second carrier frequency signal current controllers each connected between said neutral conductor and an associated end of different ones of said auxiliary transformer secondary winding portions furthest from the center-tap thereof.

12. The apparatus of claim 11, wherein each of said first and second current source controllers comprise: first and second transistors of opposite polarity type, each having a collector electrode tied to the collector electrode of the other transistor and to the end of the associated auxiliary transformer secondary winding portion furthest from the centertap thereof; said first and second transistors each having an emitter electrode and a base electrode; a metering resistance having a first terminal thereof connected to said neutral conductor;

first and second unidirectional-current-flow devices, each connected between a remaining terminal of said metering resistance and the emitter electrode of an associated transistor, and polarized to allow current flow therethrough only in the direction of normal emitter electrode current flow in the associated transistor; and first and second signal current source means for providing base current to the associated transistor during alternate half-cycles of the carrier frequency signal waveform.

13. The apparatus as set forth in claim 12, wherein each of said current signal source means has a first input, a second input, and an output at which said base current is provided with magnitude responsive to the difference in the magnitude of signals at said first and second inputs.

14. The apparatus as set forth in claim 13, wherein the signal at the second input of each of the first and second signal current sources is the voltage appearing across said metering resistance, and the signal at each of said signal current source first inputs is a representation of the modulated carrier frequency signal.

* * * * *